H. A. RUETSCHI.
MEASURING AND DELIVERING MACHINE.
APPLICATION FILED APR. 22, 1913.
1,097,471.
Patented May 19, 1914.
3 SHEETS—SHEET 1.
FIG. I.
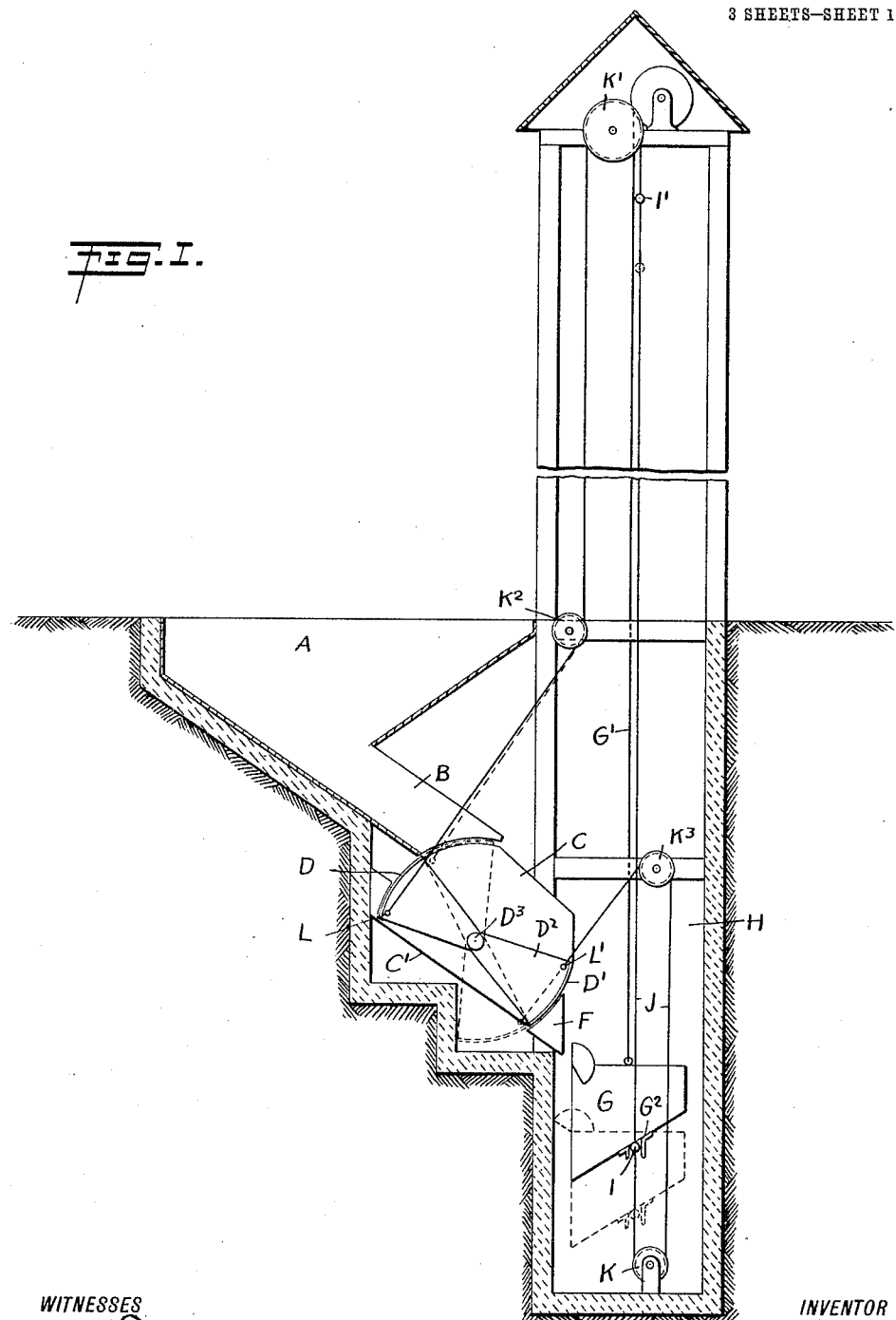
WITNESSES
INVENTOR
Hermann Adolf Ruetschi
BY
ATTORNEYS

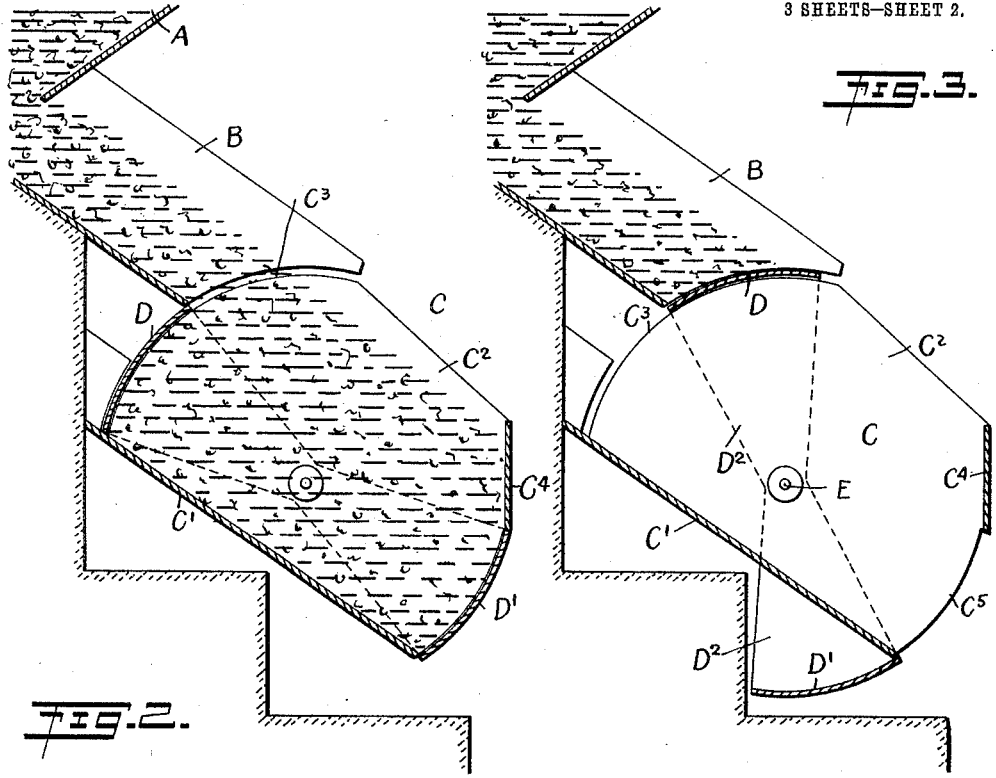
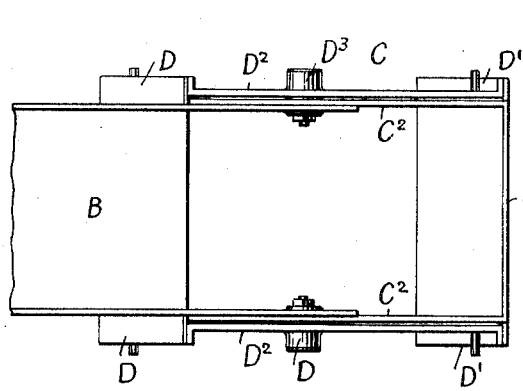
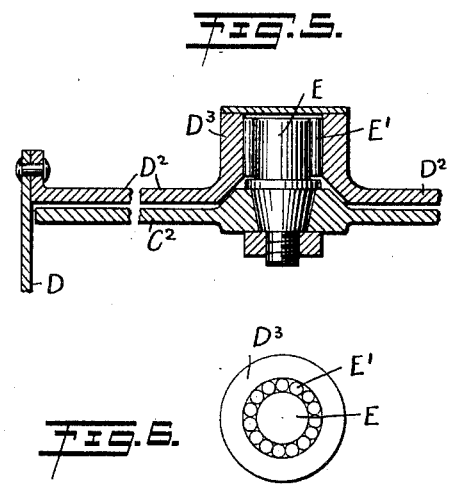

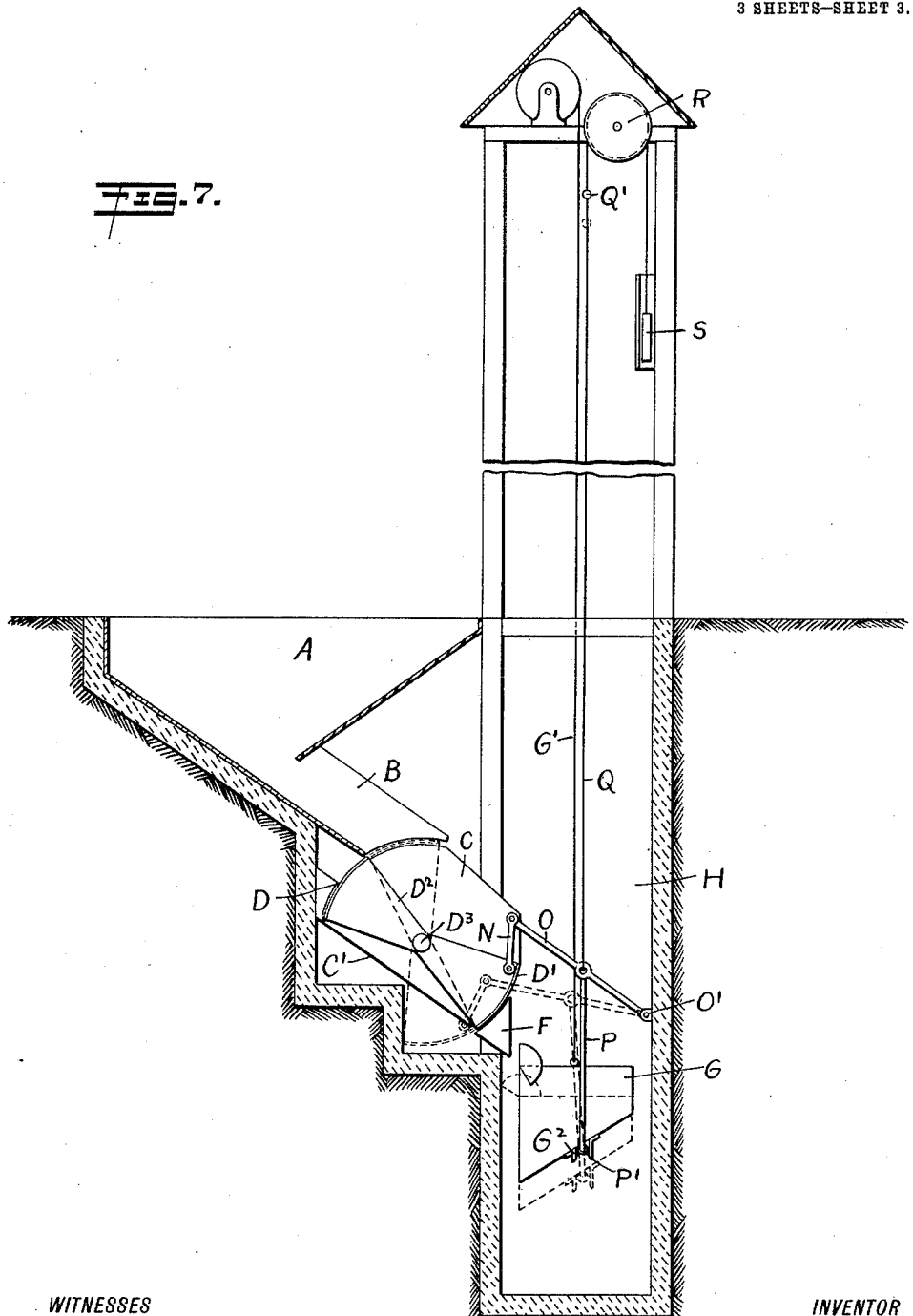

UNITED STATES PATENT OFFICE.

HERMANN ADOLF RUETSCHI, OF PUEBLO, COLORADO.

MEASURING AND DELIVERING MACHINE.

1,097,471. Specification of Letters Patent. Patented May 19, 1914.

Application filed April 22, 1913. Serial No. 762,781.

*To all whom it may concern:*

Be it known that I, HERMANN ADOLF RUETSCHI, a citizen of the United States, and a resident of Pueblo, in the county of Pueblo and State of Colorado, have invented a new and Improved Measuring and Delivering Machine, of which the following is a full, clear, and exact description.

The object of the invention is to provide a new and improved measuring and delivering machine, more especially designed for measuring and delivering loose materials, such as coal, grain, ore, rock and the like, and arranged to insure the free passage of the material from a supply chute to a measuring receptacle.

In order to accomplish the desired result, use is made of a chute adapted to contain loose material to be measured and delivered, a fixed measuring receptacle having an inlet for receiving the material from the said supply chute and having an outlet for the measured material, and a double gate mounted to oscillate and controlling the said inlet and the said outlet to open the one when closing the other and vice versa. Use is also made of a receiving receptacle, such as an elevating bucket or the like, and mechanical means controlled by the said receiving receptacle and connected with the double gate to actuate the latter in unison with the ascent and descent of the receiving receptacle.

A practical embodiment of the invention is represented in the accompanying drawings forming a part of this specification, in which similar characters of reference indicate corresponding parts in all the views.

Figure 1 is a sectional side elevation of the measuring machine; Fig. 2 is an enlarged sectional side elevation of the supply chute, the measuring receptacle and its double gate, the latter being in position for filling the measuring receptacle; Fig. 3 is a similar view of the same with the double gate in position for discharging the loose material from the measuring receptacle; Fig. 4 is a plan view of the same; Fig. 5 is an enlarged sectional plan view of one of the trunnions carried by one side of the measuring receptacle and on which the double gate is mounted to oscillate; Fig. 6 is a face view of one of the bearings of the double gate; and Fig. 7 is a sectional side elevation of the measuring and delivering machine and showing a modified form of mechanism for operating the double gate.

The loose material to be measured and delivered is placed into a hopper A provided with a chute B adapted to discharge into a measuring receptacle C of a predetermined size so that the amount of loose material measured and delivered by this receptacle at each operation can be readily determined. The measuring receptacle C is provided with an inclined bottom C', preferably parallel with and located a distance below the bottom of the supply chute B, and the said measuring receptacle C is further provided with sides $C^2$, an open segmental upper end $C^3$ and a lower end $C^4$ having an outlet $C^5$ reaching to the lower end of the bottom C', as will be readily understood by reference to Fig. 3. The upper portion of the open end $C^3$ is in register with the segmental end of the chute B to form an inlet for the loose material to pass from the chute B into the measuring receptacle C.

The inlet $C^3$ and the outlet $C^5$ are controlled by a double gate having gates D and D', of which the gate D controls the inlet $C^3$ while the gate D' controls the outlet $C^5$, the gates D and D' being segmental and connected with each other outside of the sides $C^2$ by connecting arms $D^2$ provided at their middle with bosses $D^3$ journaled on trunnions E secured to the sides $C^2$ of the measuring receptacle C, as plainly indicated in Fig. 5. Roller bearings E' are preferably interposed between the trunnions E and the bosses $D^3$ to insure an easy rocking or oscillating of the double gate D, D'. By reference to Figs. 2 and 3 it will be noticed that when the gate D is in open position the gate D' is in closed position (see Fig. 2), and when an oscillating motion is given to the double gate, as shown in Fig. 3, then the gate D closes the inlet $C^3$ to the chute B while the gate D' opens the outlet $C^5$ to allow the loose material to slide out of the measuring receptacle C. Thus the gate D cuts off the loose material from the chute B while the loose material contained in the measuring receptacle C is discharged through the opening $C^5$. When the double gate D, D' is rocked back to the position shown in Fig. 2 then the outlet $C^5$ is closed by the gate D' while the upper portion of the inlet $C^3$ is opened to allow the loose material to pass from the chute B to the measuring receptacle C to refill the same.

By constructing the measuring receptacle C in the manner described and locating the same relative to the chute B as set forth, it is evident that the receptacle C readily fills with the loose material at the time the gate D is opened and the gate D' closed. By arranging the connecting arms $D^2$ and the trunnions E on the outside of the measuring receptacle C no undesirable obstructions are formed inside of the measuring receptacle C, and the double gate D, D' is free to oscillate.

It will be noticed that the gates D, D' are subjected to pressure on one side only, and this pressure is reduced to a minimum when the gate D swings upward into closed position as it tends to roll the material forward due to its segmental travel, and the gate has only to contend with the pressure of the angle of repose of the material contained in the receptacle C. The pressure is also reduced when the gate D starts to ascend thereby causing the material to spread in the lower portion of the upper end of the receptacle C owing to the fact that the bottom C' is projected upward beyond the end $C^3$. The end $C^4$ tends to hold the material filled into the measuring receptacle C in check until the gate D' has reached about half open position.

Various means may be employed for operating the double gate D, D', as shown for instance in Figs. 1 and 7. The material passing out of the outlet $C^5$ passes over a short guiding chute F into a receiving receptacle G in the form of a mounting bucket hung on a hoisting rope G' and adapted to travel up and down in a shaft or well H. The receiving receptacle G is provided on its bottom with a fork $G^2$ adapted to straddle a rod I held on a rope or cable J passing over pulleys K, K', $K^2$ and $K^3$ arranged in a shaft H, as indicated in Fig. 1. A rod I' is arranged on the rope or cable J near the pulley K' to be engaged by the top of the receptacle G when the latter is raised to dumping position. One end of the rope or cable J is attached to a pin L held on the upper end of one of the arms $D^2$, and the other end of the rope or cable J is attached to the pin L' held on the lower end of one of the arms $D^2$. When the receiving receptacle G has descended to receiving position, as shown in full lines in Fig. 1, its fork $G^2$ engages the rod I and on the further descent of the said receptacle G a traveling motion is given to the rope or cable J so that a pull is exerted on the pin L to swing the gate D into closed position while the gate D' swings into open position to allow the measured material in the measuring receptacle C to pass through the outlet $C^5$ into the receiving receptacle G. After the material has passed from the measuring receptacle G the latter is hoisted and in doing so the top engages the pin I' whereby a traveling motion is given to the rope or cable J in a reverse direction. A pull is now exerted by the rope or cable J on the pin L' to swing the gate D' into closed position and the gate D into open position for refilling the measuring receptacle C, as previously explained. The above described operation is repeated on the next descent and ascent of the receiving receptacle G.

By the arrangement shown in Fig. 7, the lower end of one of the arms $D^2$ is connected by a link N with one end of a lever O fulcrumed at O' in the shaft H, and from the said lever O depends a rod P provided with a transverse pin P' adapted to be engaged by the fork $G^2$ of the receiving receptacle G at the time the latter moves into lowermost position. From the lever O extends upwardly a rope or cable Q provided with a pin Q' adapted to be engaged by the top of the receiving receptacle G at the time the latter moves into uppermost discharging position. The rope or cable Q passes over a pulley R and is provided with a counterweight S to hold the rope or cable Q at all times in taut position.

It will be noticed that when the receiving receptacle G moves into lowermost position a downward swinging motion is given to the lever O so that the link N actuates the gates D, D' to swing the gate D into closed position and the gate D' into open position. When this takes place the measured material passes from the receptacle C into the receiving receptacle G and the latter is then hoisted for discharging its contents. When the receptacle G moves into uppermost position it actuates the pin Q' so that the lever O is swung upward to cause the opening of the gate D and closing of the gate D'.

The supply chute B is preferably somewhat narrower than the measuring receptacle C (see Fig. 4) to prevent spilling of the material as the latter passes from the said chute into the receptacle C.

Having thus described my invention, I claim as new and desire to secure by Letters Patent:

1. A measuring and delivering machine, comprising a chute adapted to contain the supply of loose material to be measured and delivered, a fixed measuring receptacle provided with an inclined bottom parallel with and located below the bottom of the supply chute, the said receptacle being open at its upper end, the upper part of said opening being in register with the end of the chute and forming an inlet for receiving the material from the said supply chute, the said receptacle having an outlet in its other end at the lower part thereof for the measured material, and a transverse end member at the upper part of said end above the outlet, a double gate mounted to oscillate and controlling the said inlet and the said outlet to open the one when closing the other and vice versa, the upper edge of the gate member controlling the outlet engaging the lower edge of said transverse end member when the said gate member is in the closed position.

2. A measuring and delivering machine, comprising a chute adapted to contain the supply of loose material to be measured and delivered, a fixed measuring receptacle provided with an inclined bottom parallel with and located below the bottom of the supply chute, the receptacle having an inlet end for receiving the material from the said supply chute and having an outlet end for the measured material, the receptacle having a member closing the upper part of the outlet end, a double gate mounted to oscillate and controlling the said inlet and the said outlet to open the one when closing the other and vice versa, the gate member controlling the inlet being adapted to move from the upper part of the inlet end in line with the supply chute to the lower part below the bottom of the supply chute, and the gate member controlling the outlet being adapted when closed to engage the member closing the upper part of said outlet end and when open extending below the bottom of said receptacle, a movable receiving receptacle adapted to receive the measured material as it is discharged through the said outlet, and actuating means connected with the said double gate and controlled by the said movable receiving receptacle.

3. A measuring and delivering machine comprising a supply chute, a fixed measuring receptacle having an inclined bottom located below the bottom of the supply chute, the receptacle having a segmental upper end open from the bottom to the top of the receptacle, the upper portion of said open end forming an inlet and being in register with the terminal of the said supply chute, the lower end of said receptacle being closed at its upper portion and the lower portion of said end being open forming an outlet reaching to the bottom of the receptacle, a double gate mounted to oscillate on the sides of the receptacle at the lower portion thereof and adapted to close the inlet and simultaneously open the outlet and vice versa, the gate member controlling the inlet when in open position extending below the bottom of the supply chute and engaging the bottom of the receptacle and the gate member controlling the outlet when in open position extending below the bottom of the receptacle, and means for imparting an oscillating motion to the said double gate.

4. A measuring and delivering machine, comprising a chute adapted to contain the supply of loose material to be measured and delivered, a fixed measuring receptacle having an inclined bottom stepped relative to the said chute, the said measuring receptacle having an open segmental upper end forming an inlet for receiving the material from the said supply chute and the said measuring receptacle having a lower end provided at its upper portion with a transverse end member connecting the sides of the receptacle, the lower portion of said end being open forming an outlet reaching from said end member to the said bottom, trunnions exteriorly on the sides of the said measuring receptacle, a double gate comprising connected gates mounted to swing on the said trunnions and moving over the said inlet and the said outlet to open the one when closing the other and vice versa, the upper edge of the gate controlling the outlet engaging the lower edge of said end member, when the said gate is in closed position, and actuating means for imparting oscillating movement to the said double gate.

5. A measuring and delivering machine comprising a chute adapted to contain the supply of loose material to be measured and delivered, a fixed measuring receptacle having an inclined bottom stepped relatively to the said chute, the said measuring receptacle having an open segmental upper end forming an inlet for receiving the material from the said supply chute and the said measuring receptacle having a lower end provided at its upper portion with an end member connected with the sides of the receptacle, the lower portion of said end being open forming an outlet reaching from the said end member to the said bottom, trunnions exteriorly on the sides of the said receiving receptacle, a double gate, arms connecting the members of the double gate and provided at their middle with bosses mounted to swing on the said trunnions, the said double gate controlling the said inlet and the said outlet to open the one when closing the other and vice versa, an elevating bucket, and actuating means connected with the said double gate and controlled by the said bucket.

6. A measuring and delivering machine comprising a hopper for the loose material to be measured and delivered, the hopper being provided with an inclined chute, a fixed measuring receptacle having an inclined bottom located below the bottom of the chute, the said measuring receptacle having an inlet for receiving the material from the said chute, and having an outlet for the measured material, trunnions secured to the sides of the measuring receptacle, segmental gates for controlling the said inlet and the said outlet, connecting arms connecting the gates with each other outside of the sides of the receptacle, the said connecting arms being provided at their middle with bosses journaled on the said trunnions, roller bearings interposed between the trunnions and the said bosses, and means for imparting an oscillating motion to the said gates.

In testimony whereof I have signed my name to this specification in the presence of two subscribing witnesses.

HERMANN ADOLF RUETSCHI.

Witnesses:
   J. ARTHUR DAVIS,
   FRANK D. PREST.

Copies of this patent may be obtained for five cents each, by addressing the "Commissioner of Patents, Washington, D. C."